UNITED STATES PATENT OFFICE.

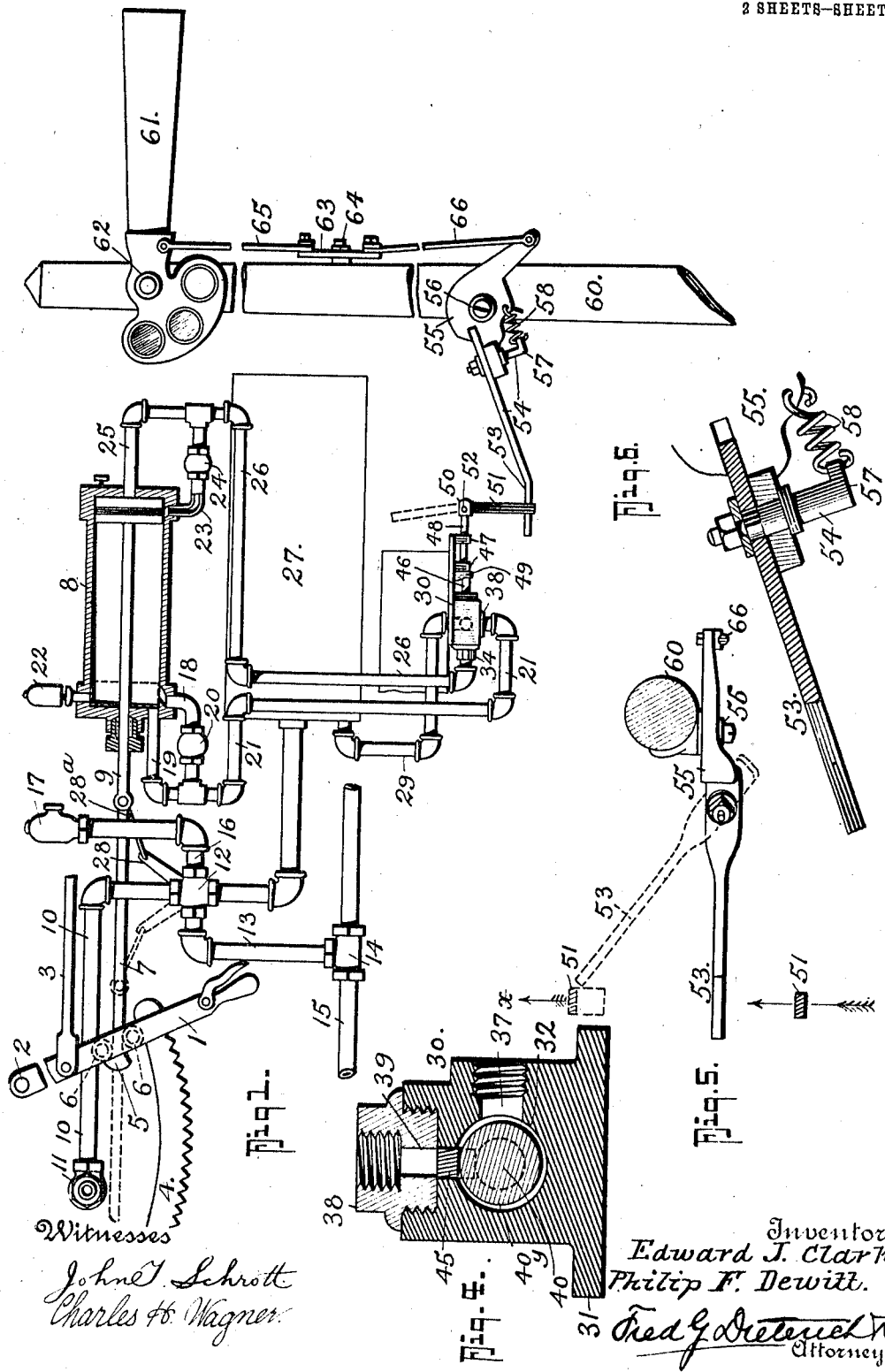

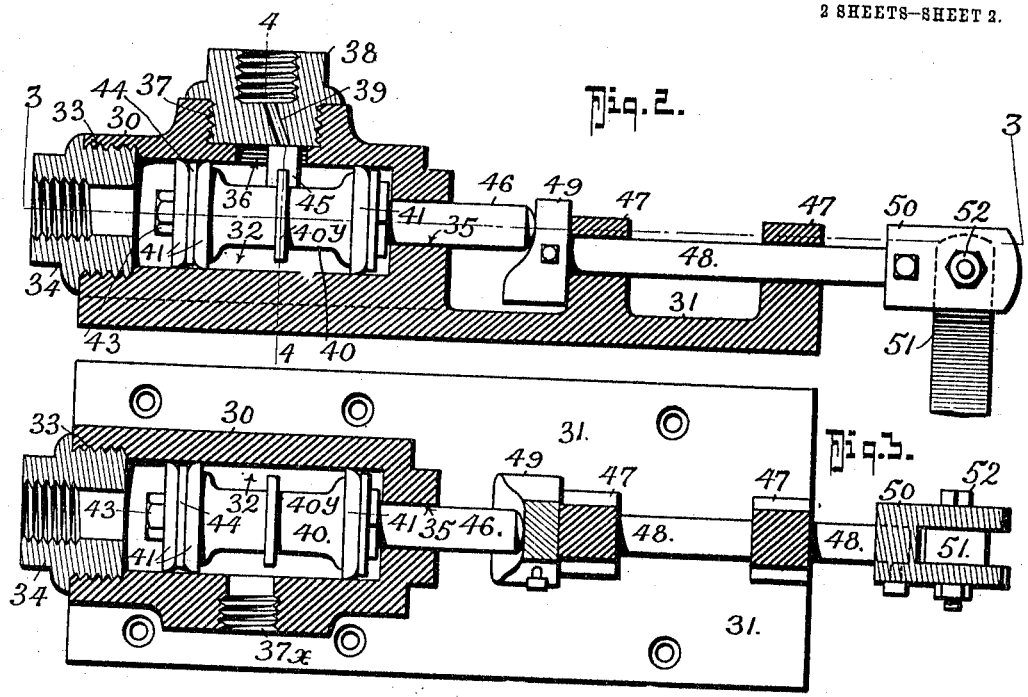

EDWARD J. CLARKE AND PHILIP F. DEWITT, OF SCRANTON, PENNSYLVANIA.

TRAIN CONTROLLING AND STOPPING MECHANISM.

1,004,148. Specification of Letters Patent. Patented Sept. 26, 1911.

Application filed January 17, 1910. Serial No. 538,480.

*To all whom it may concern:*

Be it known that we, EDWARD J. CLARKE and PHILIP F. DEWITT, residing at Scranton, in the county of Lackawanna and State of Pennsylvania, have invented certain new and useful Improvements in Train Controlling and Stopping Mechanisms, of which the following is a specification.

Our invention relates to certain new and useful improvements in train stopping and controlling mechanisms, wherein automatically actuated valve mechanisms serve to set the air brakes of a train and close the engineer's throttle valve.

More specifically, the present invention relates to that type of train controlling and stopping mechanism disclosed in our former Patents No. 845,727 and No. 893,053 issued February 26, 1907 and July 14, 1908, respectively.

Our present invention has for its object to provide a mechanism of the character stated, of a simple and effective construction, in which the first cost is reduced to the lowest possible figure, and which, when installed, will involve the smallest possible upkeep expense.

Generically, the present invention resides in providing an improved operating valve in connection with the train stopping air brake system for controlling the automatic setting of the air brakes and closing of the engineer's throttle valve.

More specifically our present invention resides in those novel details of construction, combination and arrangement of parts, all of which will be first fully described, then be specifically pointed out in the appended claims, and illustrated in the accompanying drawings, in which:—

Figure 1, is a diagrammatic view illustrating the general application of our invention in use in connection with mechanically controlled tripping devices. Fig. 2, is an enlarged central vertical longitudinal section of the operating valve. Fig. 3, is a horizontal section on the line 3—3 of Fig. 2. Fig. 4, is a cross section on the line 4—4 of Fig. 2. Fig. 5, is a top plan view of the trip. Fig. 6, is a detail sectional view thereof.

Referring now to the accompanying drawings, in which like letters and numerals of reference indicate like parts in all of the figures, 1 designates the throttle lever which is pivoted at 2 and pivotally connected to the throttle valve rod 3, as indicated in the drawings. The lever 1 is locked in its various positions by a spring-pressed pawl that engages a rack 4, as usual, the lever also carries a pair of rollers 6—6, between which a rod 7, having a head 5 passes, the rod 7 pivotally connecting to the piston rod 9 of the throttle cylinder 8, hereinafter again referred to.

The engineer's brake valve 11 is connected through a pipe 10 with the main reservoir 27, a double cock, or valve 12 being interposed in the pipe 10, between the reservoir 27 and the engineer's brake valve 11. The valve 12 has one of its ports connected by a pipe 13 with the union 14 in the train pipe 15 of the air brake system. The port of the valve 12 which opposes that to which pipe 13 is connected, joins with a pressure reducing valve 17, through a pipe 16.

The throttle cylinder 8 has a pipe 18 that joins with a pipe 21 through a back check valve 20 and has a by-pass 19, as indicated. A second pipe 23, having a back check valve 24 joins with the cylinder 8 and with a pipe 26, a by-pass 25 being provided, as indicated. A whistle 22 is provided to operate when compressed air enters the cylinder 8 through the inlet pipe 21.

The double cock or valve 12 has its lever 28 connected through a flexible connection 28ᵃ to the piston rod 9 of the throttle cylinder 8. All of the foregoing parts may be of the same construction as those corresponding parts shown in our Patent No. 893,053, hereinbefore referred to, and a detailed drawing and description thereof is unnecessary in this application, as the construction and operation of such parts will be readily understood by reference to the patent above referred to.

The following described parts, *per se*, and in combination with those parts hereinbefore described, form the subject-matter of the present application.

30 represents the operating valve whose cylinder has a chamber 32 open at one end and tapped as at 33, to receive a threaded plug 34 into which the pipe 26 is threaded to establish communication between the valve 30 and cylinder 8. The valve casing or cylinder 30 has a second threaded opening 37 closed by a plug 38, into which pipe 21 is passed, the plug 38 having a port 39 controlled by a slide valve 45 which operates in a slideway 36 in the casing 30, and is moved by a web 40ʸ on the piston valve 40 that operates in the chamber 32 of the casing 30. The valve 40 has cupped washers 41—41 at its ends, held in place by a metallic disk 44 and nut 43, the valve between the washers 41—41 at its end, is of reduced diameter to pass air from the port 37ˣ to the port 39 when the valve 45 opens such latter port. The port 37ˣ is connected to the main reservoir 27 by a pipe 29. The casing 30 has its forward end apertured at 35 to pass the stem 46 of the valve 40 and permit it to engage the cam 49 on the rotary shaft 48 which is held in bearings 47 on the base plate 31. The shaft 48 is turned through the medium of a lever 51, which is pivoted at 52 to the head 50 of the shaft 48. The lever 51 is operated by a trip finger 53 that is secured to a rod 54 which is pivoted in a projection in a bearing member 55, the rod 54 being bent at an angle as at 57 to join with a coil spring 58 which is in turn connected to the bearing 55 to normally project the finger 53 into operative position. A stop or guide 59 is provided to guide the trip finger 53. The bearing 55 is pivoted at 56 to a post 60 which may carry the semaphore 61. The semaphore 61, which may be of the usual construction, and which may be set in the usual manner, is pivoted at 62 to the post 60 and is joined with the bearing member 55 by rods 66—65 and an interposed lever 63 to which such rods 66—65 are connected. The lever 63 is pivoted at 64 to the post 60.

In practice a valve 30 is placed on the pilot of an engine, one valve on each side of the engine and each valve is piped up, as shown, with the reservoir 27 and the throttle operating cylinder 8. Either one, or both valves 30, may be used at the same time. When one valve is to be operated alone the lever 51 is swung up to the position shown in dotted lines in Fig. 1, when it will not be engaged by the trip finger 53. In practice the trips are placed one on each side of a single track line at suitable blocks or intervals apart along the right-of-way, while on double track lines, trips are placed only on the right hand side of a track.

In operation when it is desired to stop a train the semaphore 61 is raised to its danger position, bringing the finger 53 within the path of travel of the lever 51 of the valve 30, so that the finger 53 will be struck by the lever 51 and impact it. A rotary motion is thus imparted to the shaft 48, thereby causing the cam 49 to move the piston 40 from right to left, in Fig. 2, and thereby open the port 39 to permit the air from the main reservoir 27 to pass through the pipe 29 and port 37ˣ into the valve casing 30, between the ends of the piston 40. The air passes out of the casing 30 through the port 39 to the pipe 21, through which it is conveyed to the forward end of the throttle cylinder 8. The air entering the cylinder 8 at the forward end forces the piston from the dotted position to the full line position in Fig. 1, or in other words from left to right in Fig. 1, to release the lever 1 and move it to the position shown in full lines in Fig. 1, and at the same time move the valve 12 to close communication between the engineer's brake valve and the main reservoir 27 and to open communication between the train pipe 15 and the pressure reducing valve 17 in a manner clearly made apparent by reference to our Patent 893,053, hereinbefore referred to. This serves to set the brakes for a service stop or for a full stop, according as to how the valve 17 may be adjusted. Upon the movement of the throttle cylinder piston, from left to right, in Fig. 1, a whistle 22 will be operated to notify the engineer of the operation of the mechanism. As soon as the piston 40 has opened port 39 to permit the compressed air to pass to the cylinder 8 to stop the train, the compressing of the air in pipe 26 by the movement of the piston in the cylinder 8 serves to move the piston 40 from left to right, in Fig. 2, and reset the valve 30, when it is ready to be operated again. While the air in pipe 26 is compressed, the resetting of the valve 30 is insured by reason of the bypass 25 permitting fluid under pressure from the member 8 to flow therein and reset the valve 30, the closing of the valve 30 and relief of pressure in the cylinder 8 via whistle 22 permits the air in pipe 26 beyond the check valve 24 and compression therein, to expand back via pipe 25 and carry its piston substantially into the original position to reset it as well as the piston 40 in operating valve 30. It should be understood that the amount of air in the pipes 26, 25, 25 and the cylinder 8 when the piston is in the dotted line position shown in Fig. 1 is the same as is present in the pipes 25, 25 and 26 when the piston is in the full line position shown in Fig. 1 with this exception that in the former case the air is under a lesser pressure (substantially atmospheric pressure) than it is under when the piston 8 has been moved to the full line position shown in Fig. 1, therefore, when pressure to the left of cylinder 8 in Fig. 1 is relieved the expanding air pressure in pipe 25 causes the piston in cylinder 8 to be moved back to its original dotted line position at which time the air in pipes 25 and 26 will have arrived at its minimum compression.

What we claim is:

1. In a train stopping mechanism, the combination with the air brake system of a train and with the engineer's throttle valve; a throttle valve closing and brake setting cylinder and its piston, combined with a single structure operating valve and resetting device coöperatively connected with said throttle cylinder and with the main reservoir of the air brake system.

2. In a train stopping mechanism, the combination with the air brake system of a train and with the engineer's throttle valve; a throttle valve closing and brake setting cylinder and its piston, combined with a single structure operating valve and resetting device coöperatively connected with said throttle cylinder and with the main reservoir of the air brake system, and a mechanism for moving said valve.

3. In combination with an air brake system of a train, including an air valve, a cylinder and its piston joined with said valve to move the same; a single structure operating valve and resetting device piped up with said cylinder and with the main reservoir of the air brake system to control the passage of air from the main reservoir to said cylinder, and means conveying air from said cylinder to said operating valve to reset the same.

4. In combination with the air brake system of a train including an air valve and with the engineer's throttle lever and valve, a cylinder and its piston joined with said air valve and with said throttle lever to move the same; a single structure operating valve and resetting device piped up with said cylinder and with the main reservoir of the air brake system to control the passage of air from the main reservoir to said cylinder, and means conveying air from said cylinder to said operating valve to reset the same.

5. In a train stopping system, the combination with the air brake system of a train including an air valve, of a cylinder and piston coöperatively connected with said valve to move the same, an operating valve, pipe connections between the main reservoir of the air brake system and said operating valve, pipe connections between one end of said cylinder and said operating valve, said operating valve having a piston for controlling the passage of air through said operating valve, said operating valve having a piston rod, and rotatable means for moving said piston rod axially to move said operating valve piston to open communication between said main reservoir and one end of said cylinder to move said cylinder piston in one direction.

6. In a train stopping system, the combination with the air brake system of a train including an air valve, of a cylinder and piston coöperatively connected with said valve to move the same, an operating valve, pipe connections between the main reservoir of the air brake system and said operating valve, pipe connections between both ends of said cylinder and said operating valve, said operating valve having a piston for controlling the passage of air through said operating valve, said operating valve having a piston rod, rotatable means for moving said piston rod axially to move said operating valve piston to open communication between said main reservoir and one end of said cylinder to move said cylinder piston in one direction to move said air valve and reset said operating valve piston.

7. An operating valve for train stopping mechanisms comprising a valve casing having an internal chamber, a piston operating in said chamber and having a reduced central portion, said valve casing having a slideway, a port entering said casing chamber through said slideway, a slide valve controlling said port, and means causing said slide valve to move with said piston, said casing having a second port in communication with the interior of said valve casing at the reduced portion of said piston to pass air through said casing to said port when open, said operating valve casing having a port to admit air into said valve casing at one end against one end of said piston, and mechanical means for moving said piston longitudinally.

8. An operating valve for train stopping mechanisms comprising a valve casing having an internal chamber, a piston operating in said chamber and having a reduced central portion, said valve casing having a slideway, a port entering said casing chamber through said slideway, a slide valve controlling said port, and means causing said slide valve to move with said piston, said casing having a second port in communication with the interior of said valve casing at the reduced portion of said piston to pass air through said casing to said port when open, said operating valve casing having a port to admit air into said valve casing at one end against one end of said piston, mechanical means for moving said piston longitudinally, said mechanical means comprising a rotatable shaft and cam devices coöperatively connecting said shaft with said piston.

EDWARD J. CLARKE.
PHILIP F. DEWITT.

Witnesses:
FRANK R. STOCKER,
M. J. WALSH.

---

Copies of this patent may be obtained for five cents each, by addressing the "Commissioner of Patents, Washington, D. C."